(12) United States Patent
Baek

(10) Patent No.: US 12,291,202 B2
(45) Date of Patent: May 6, 2025

(54) LANE KEEPING CONTROLLER, VEHICLE SYSTEM INCLUDING THE SAME, AND METHOD THEREOF

(71) Applicants: HYUNDAI MOTOR COMPANY, Seoul (KR); Kia Corporation, Seoul (KR)

(72) Inventor: Un Tae Baek, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 351 days.

(21) Appl. No.: 17/545,298

(22) Filed: Dec. 8, 2021

(65) Prior Publication Data

US 2022/0388508 A1 Dec. 8, 2022

(30) Foreign Application Priority Data

Jun. 4, 2021 (KR) ........................ 10-2021-0072905

(51) Int. Cl.
 *B60W 30/12* (2020.01)
(52) U.S. Cl.
 CPC ......... *B60W 30/12* (2013.01); *B60W 2520/06* (2013.01); *B60W 2520/10* (2013.01); *B60W 2520/12* (2013.01); *B60W 2520/125* (2013.01); *B60W 2552/30* (2020.02); *B60W 2552/53* (2020.02)
(58) Field of Classification Search
 CPC ............. B60W 30/12; B60W 2520/06; B60W 2520/10; B60W 2520/12; B60W 2520/125; B60W 2552/30; B60W 2552/53; B60W 2050/001; B60W 30/08; B60W 40/02; B60W 40/072; B60W 40/105; B60W 40/109; B60W 2050/0005; B60W 2050/0049; B60W 2530/18; B60Y 2300/08; B60Y 2300/12
 USPC .......................................................... 701/26
 See application file for complete search history.

(56) References Cited

U.S. PATENT DOCUMENTS

| 6,185,492 B1* | 2/2001 | Kagawa ............... B62D 15/025 |
| | | 701/28 |
| 9,352,778 B2 | 5/2016 | Yoon et al. |
| 2013/0317698 A1 | 11/2013 | Yoon et al. |
| 2019/0061808 A1* | 2/2019 | Mizoguchi ............ G01C 21/26 |
| 2022/0063722 A1* | 3/2022 | Omikawa ............. B60W 30/12 |

FOREIGN PATENT DOCUMENTS

KR 10-2013-0130951 A 12/2013

* cited by examiner

*Primary Examiner* — Marc Burgess
*Assistant Examiner* — Ashleigh Nicole Turnbaugh
(74) *Attorney, Agent, or Firm* — MORGAN, LEWIS & BOCKIUS LLP

(57) ABSTRACT

A lane keeping controller, a vehicle system including the same, and a method thereof are provided. The lane keeping controller includes a processor that monitors a risk level of a vehicle in real time, upon a lane keeping control, calculates a target lateral movement distance based on a line component, integrates an offset from a predetermined offset threshold to the vehicle, when an offset between a target route and the vehicle departs from the predetermined offset threshold, and corrects the target lateral movement distance based on the integrated value to calculate a final target lateral movement distance and a storage storing data and an algorithm run by the processor.

13 Claims, 8 Drawing Sheets

LANE KEEPING CONTROLLER, VEHICLE SYSTEM INCLUDING THE SAME, AND METHOD THEREOF

CROSS-REFERENCE TO RELATED APPLICATION

This application claims the benefit of priority to Korean Patent Application No. 10-2021-0072905, filed on Jun. 4, 2021 with the Korean Intellectual Property Office, the entire contents of which are incorporated herein by reference.

TECHNICAL FIELD

The present disclosure relates to a lane keeping controller, a system including the same, and a method thereof, and more particularly, relates to technologies of controlling lane center following using integration of an offset of a vehicle.

BACKGROUND

Various systems for safe driving have been applied to vehicles recently produced or have been in development for application. One of them is a lane keeping control system for performing driving control to keep the line to prevent the vehicle from departing from the line, when the vehicle departs from the line due to careless driving of a driver.

Such a lane keeping control system is a driving convenience system which helps the vehicle to perform steering such that the vehicle detects the line using a front view camera and keeps a lane center (a target trajectory) to travel on all areas and all speed areas in the lane.

However, a conventional lane keeping control system causes a phenomenon in which the driving vehicle does not keep center following and yaws to one side when passing through a sharp curved section or a large lateral gradient, thus causing the driver to feel insecure and resulting in deterioration in reliability of the system.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a lane keeping controller for enhancing lane center following performance by integrating an offset between a vehicle and an offset threshold when center following performance of the vehicle is degraded, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lane keeping controller may include a processor that monitors a risk level of a vehicle in real time, upon a lane keeping control, calculates a target lateral movement distance based on a line component, integrates an offset from a predetermined offset threshold to the vehicle, when an offset between a target route and the vehicle departs from the predetermined offset threshold, and corrects the target lateral movement distance based on the integrated value to calculate a final target lateral movement distance and a storage storing data and an algorithm run by the processor.

In an embodiment, the processor may determine whether a driving situation of the vehicle meets a risk level 1 condition using a vehicle speed, a curvature, and a lateral acceleration.

In an embodiment, the processor may determine whether the driving situation meets a risk level 2 condition using the offset between the target route and the vehicle, when the driving situation meets the risk level 1 condition.

In an embodiment, the processor may add a value obtained by integrating the offset from the predetermined offset threshold to the vehicle to the target lateral movement distance, when the driving situation meets both the risk level 1 condition and the risk level 2 condition.

In an embodiment, the processor may determine that the driving situation meets the risk level 2 condition, when the offset between the target route and the vehicle is greater than the predetermined offset threshold.

In an embodiment, the processor may determine whether the driving situation meets the risk level 1 condition, when the vehicle speed is greater than a predetermined first reference value, when the curvature is greater than a predetermined second reference value, and when the lateral acceleration is greater than a predetermined third reference value.

In an embodiment, the processor may reset a value obtained by integrating the offset from the predetermined offset threshold to the vehicle, when the driving situation does not meet at least one of the risk level 1 condition or the risk level 2 condition.

In an embodiment, the processor may calculate the target lateral movement distance by means of a polynomial according to at least one of the offset from the target route and the vehicle, a heading angle of the vehicle, a curvature of a road, or a curvature change rate of the road and a look-ahead distance.

In an embodiment, the processor may control the vehicle based on the final target lateral movement distance to follow the target route.

In an embodiment, the processor may define an area ranging from the left of the target route to the right of the target route up to the predetermined offset threshold as a safe area and may define an area departing from the predetermined offset threshold as an integration performance area.

In an embodiment, the processor may calculate the target lateral movement distance based on line component information, when the vehicle is located on the safe area.

In an embodiment, the processor may integrate the offset from the predetermined offset threshold to the vehicle and may add the integrated value to the target lateral movement distance to calculate the final target lateral movement distance, when the vehicle is located on the integration performance area.

According to another aspect of the present disclosure, a vehicle system may include a sensing device that senses vehicle information and a lane keeping controller that monitors a risk level of a vehicle in real time based on the vehicle information, upon a lane keeping control, calculates a target lateral movement distance based on a line component, integrates an offset from a predetermined offset threshold to the vehicle, when an offset between a target route and the vehicle departs from the predetermined offset threshold, and corrects the target lateral movement distance based on the integrated value to calculate a final target lateral movement distance.

In an embodiment, the lane keeping controller may determine whether a driving situation of the vehicle meets a risk level 1 condition using a vehicle speed, a curvature, and a lateral acceleration and may determine whether the driving situation meets a risk level 2 condition using the offset between the target route and the vehicle, when the driving situation meets the risk level 1 condition.

In an embodiment, the lane keeping controller may add a value obtained by integrating the offset departing from the predetermined offset threshold to the target lateral movement distance, when the driving situation meets both the risk level 1 condition and the risk level 2 condition.

In an embodiment, the vehicle information may include at least one of the offset between the target route and the vehicle, a heading angle, a curvature, a curvature change rate, a vehicle speed, or a lateral acceleration.

According to an aspect of the present disclosure, a lane keeping control method may include monitoring a risk level of a vehicle in real time, upon a lane keeping control, calculating a target lateral movement distance based on a line component and integrating an offset from a predetermined offset threshold to the vehicle, when an offset between a target route and the vehicle departs from the predetermined offset threshold, and correcting the target lateral movement distance using the integrated value to calculate a final target lateral movement distance.

In an embodiment, the monitoring of the risk level of the vehicle in real time may include determining whether a driving situation of the vehicle meets a risk level 1 condition using a vehicle speed, a curvature, and a lateral acceleration and determining whether the driving situation meets a risk level 2 condition using the offset between the target route and the vehicle, when the driving situation meets the risk level 1 condition.

In an embodiment, the calculating of the final target lateral movement distance may include adding a value obtained by integrating the offset from the predetermined offset threshold to the vehicle to the target lateral movement distance, when the driving situation meets both the risk level 1 condition and the risk level 2 condition.

In an embodiment, the calculating of the final target lateral movement distance may include resetting the value obtained by integrating the offset from the predetermined offset threshold to the vehicle, when the driving situation does not meet at least one of the risk level 1 condition or the risk level 2 condition.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
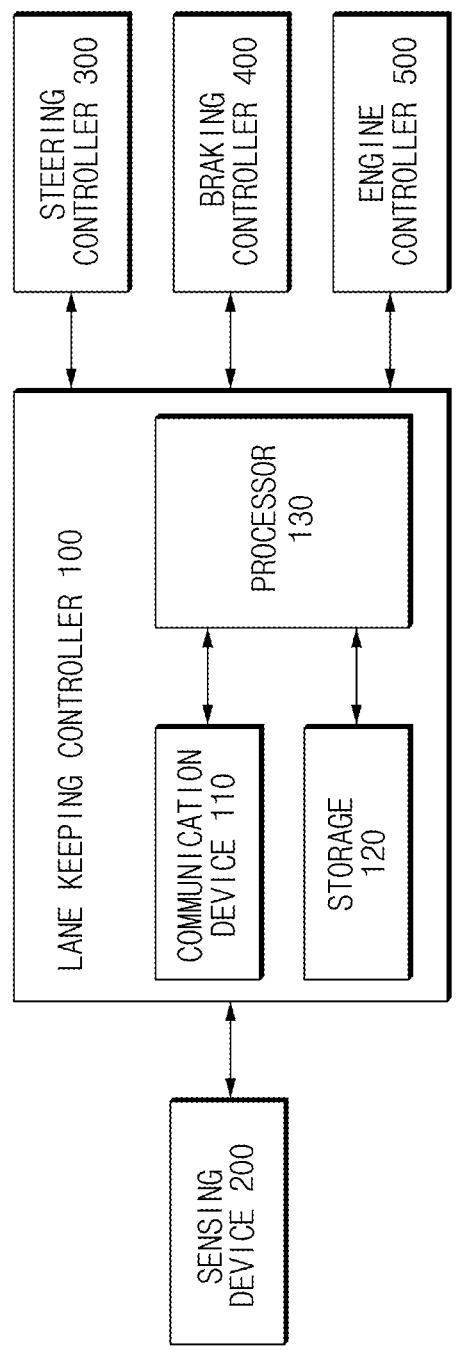
FIG. 1 is a block diagram illustrating a configuration of a vehicle system including a lane keeping controller according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a block diagram illustrating a configuration of a vehicle system including a lane keeping controller according to an exemplary embodiment of the present disclosure.

Referring to FIG. 1, the vehicle system according to an exemplary embodiment of the present disclosure may include a lane keeping controller 100, a sensing device 200, a steering controller 300, a braking controller 400, and an engine controller 500.

The lane keeping controller 100 according to an exemplary embodiment of the present disclosure may be implemented in a vehicle. In this case, the lane keeping controller 100 may be integrally configured with control units in the vehicle or may be implemented as a separate device to be connected with the control units of the vehicle by a separate connection means. The lane keeping controller 100 may be implemented as lane following assist (LFA), lane departure warning (LDW), lane keeping system (LKS), lane keeping assistance system (LKAS), or the like.

The lane keeping controller 100 may monitor a risk level of the vehicle in real time upon lane keeping control and may calculate a target lateral movement distance based on a line component. When an offset between a target route and the vehicle departs from a predetermined offset threshold, the lane keeping controller 100 may integrate an offset from the offset threshold to the vehicle and may correct the target lateral movement distance based on the integrated value to calculate a final target lateral movement distance.

In other words, the lane keeping controller 100 may monitor an offset between the vehicle and the route. When the offset is greater than the predetermined offset threshold, lane keeping controller 100 may add the amount of integration of the offset which is greater than the predetermined offset threshold to the target lateral movement distance to increase the amount of lane keeping assistance control at the moment of danger to improve performance of lane center following, thus addressing a problem in which the vehicle yaws to one side or the tire treads the line because steering responsiveness of the vehicle is not followed on the road when there are many changes in bank angle and curvature.

Referring to FIG. 1, the lane keeping controller 100 may include a communication device 110, a storage 120, and a processor 130.

The communication device 110 may be a hardware device implemented with various electronic circuits to transmit and receive a signal through a wireless or wired connection, which may transmit and receive information with devices in the vehicle based on a network communication technology in the vehicle. As an example, the network communication technology in the vehicle may include controller area network (CAN) communication, local interconnect network (LIN) communication, flex-ray communication, or the like.

As an example, the communication device 110 may communicate with the devices in the vehicle and may receive a sensing result from the sensing device 200. Particularly, the communication device 110 may receive vehicle information from the sensing device 200 and devices in the vehicle. As an example, the vehicle information may include at least one of an offset between a target route and the vehicle, a heading angle, a curvature, a curvature change rate, a vehicle speed, or a lateral acceleration.

The storage 120 may store a sensing result of the sensing device 200 and data, algorithms, and/or the like necessary for an operation of the processor 130. As an example, the storage 120 may store vehicle information (e.g., a heading angle, an offset, or the like) received from the sensing device 200 and may store a target lateral movement distance or the like calculated by the processor 130.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below.

The processor 130 may process a signal delivered between the respective components of the lane keeping controller 100. The processor 130 may be, for example, an electronic control unit (ECU), a micro controller unit (MCU), or another sub-controller, which is loaded into the vehicle.

The processor 130 may monitor a risk level of the vehicle in real time upon lane keeping control and may calculate a target lateral movement distance based on a line component. When an offset between a target route and the vehicle departs from a predetermined offset threshold, the processor 130 may integrate an offset from the offset threshold to the vehicle and may correct the target lateral movement distance based on the integrated value to calculate a final target lateral movement distance.

The processor 130 may determine whether a driving situation of the vehicle meets a risk level 1 condition using a vehicle speed, a curvature, and a lateral acceleration. Equation 1 below indicates a formula of determining the risk level 1 condition.

$$V_x > V_{threshold} \ \&$$

$$\left|\frac{1}{R}\right| > \frac{1}{R_{threshold}} \ \& \quad \text{[Equation 1]}$$

$$|A_y| > A_{y,threshold}$$

Vx denotes the vehicle speed, $V_{threshold}$ denotes the vehicle speed threshold, $$\frac{1}{R}$$

denotes the roast curvature, $$\frac{1}{R_{threshold}}$$

denotes the curvature threshold, $A_y$ denotes the lateral acceleration, and $A_{y,threshold}$ denotes the lateral acceleration threshold.

When the vehicle speed is greater than a predetermined first reference value, when the curvature is greater than a predetermined second reference value, and when the lateral acceleration is greater than a predetermined third reference value, the processor 130 may determine whether the driving situation meets the risk level 1 condition.

When the driving situation meets the risk level 1 condition, the processor 130 may determine whether the driving situation meets a risk level 2 condition using the offset between the target route and the vehicle.

When the offset between the target route and the vehicle is greater than the predetermined offset threshold, the processor 130 may determine that the driving situation meets the risk level 2 condition. Equation 2 below indicates the risk level 2 condition.

$$|C_0| > C_{0,threshold}$$

$$|C_0| \le C_{0,threshold} \quad \text{[Equation 2]}$$

$C_{0,threshold}$ denotes the offset threshold.

When the offset $C_0$ of the vehicle is greater than the offset threshold, the processor 130 may determine that the driving situation of the vehicle meets the risk level 2 condition. When the offset $C_0$ of the vehicle is less than or equal to the offset threshold, the processor 130 may determine that the vehicle is located on a safe area which does not meet the risk level 2 condition.

When the driving situation meets both the risk level 1 condition and the risk level 2 condition, the processor 130 may add a value obtained by integrating the offset from the offset threshold to the vehicle to the target lateral movement distance. Equation 3 below is a formula of calculating the final target lateral movement distance.

$$y_{total} = y_{cam} + K_{gain} \int_0^t C_0(t)$$ [Equation 3]

$y_{total}$ denotes the final target lateral movement distance, and $y_{cam}$ denotes the target lateral movement distance based on the safe area which is an area within the vehicle offset threshold, which denotes the target lateral movement distance calculated based on the parameter for each component of the line. $K_{gain} \int_0^t C_0(t)$ refers to the integration value of the integration performance area which is the vehicle offset threshold departure area. The integration value of the integration performance area is the amount of lateral control for returning to the center in a counter direction of the departure direction.

In this case, $y_{cam}$ may be represented in detail as Equation 4 below.

$$y_{total} = C_3 \chi^3 + C_2 \chi^2 + C_1 \chi + C_0 + K_{gain} \int_0^t C_0(t)$$ [Equation 4]

$y_{cam}$ is identical to $C_3 \chi^3 + C_2 \chi^2 + C_1 \chi + C_0$ and is the same as the existing formula of calculating the target lateral movement distance based on the camera. $\chi$ refers to the look-ahead distance, $C_0$ refers to the offset, $C_1$ refers to the heading angle, $C_2$ refers to the curvature, and $C_3$ refers to the curvature change rate.

The processor 130 may calculate the target lateral movement distance $y_{cam}$ based on a safe area by means of a polynomial according to a parameter (e.g., an offset, a heading angle, a curvature, or a curvature change rate) for each component of the line and the look-ahead distance x.

When the driving situation does not meet at least one of the risk level 1 condition or the risk level 2 condition the processor 130 may reset the value obtained by integrating the offset from the offset threshold to the vehicle to "0". In other words, the processor 130 may calculate the target lateral movement distance based on the safe area as the final target lateral movement distance without reflecting the value obtained by integrating the offset from the offset threshold to the vehicle.

The processor 130 may control the vehicle based on the final target lateral movement distance to follow the target route.

The processor 130 may define an area ranging from the left of the target route to the right of the target route up to the offset threshold as the safe area and may define an area departing from the offset threshold as the integration performance area.

When the vehicle is located on the safe area, the processor 130 may calculate the target lateral movement distance based on line component information.

When the vehicle is located on the integration performance area, the processor 130 may integrate the offset from the offset threshold to the vehicle and may add the integrated value to the target lateral movement distance to calculate the final target lateral movement distance.

As such, the processor 130 may determine a worse condition (e.g., a sharp condition or a lateral gradient) and a departure situation of the vehicle as risk level 1 and risk level 2 and may increase the amount of target lateral movement distance control as much as integration and addition of the offset from which the vehicle departs upon lane keeping assistance control, thus ensure improvement of center following performance and avoiding a critical situation.

The sensing device 200 may have a plurality of sensors to sense objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include a camera, an ultrasonic sensor, a radar, a laser scanner and/or a corner radar, a light detection and ranging (LiDAR), an acceleration sensor, a yaw rate sensor, a torque sensor and/or a wheel speed sensor, a steering angle sensor, or the like. In an exemplary embodiment of the present disclosure, the sensing device 200 may capture an image in front of the vehicle using a front view camera and may provide the processor 130 with the captured image. Thus, the processor 130 may obtain line information, location information in the lane of preceding vehicles in front of the vehicle, or the like from image data obtained by capturing the image in front of the vehicle.

The steering controller 300 may be configured to control a steering angle of the vehicle and may include a steering wheel, an actuator interlocked with the steering wheel, and a controller for controlling the actuator.

The braking controller 400 may be configured to control braking of the vehicle and may include a controller for controlling a brake.

The engine controller 500 may be configured to control to drive an engine of the vehicle and may include a controller for controlling a speed of the vehicle.

Figure 2:
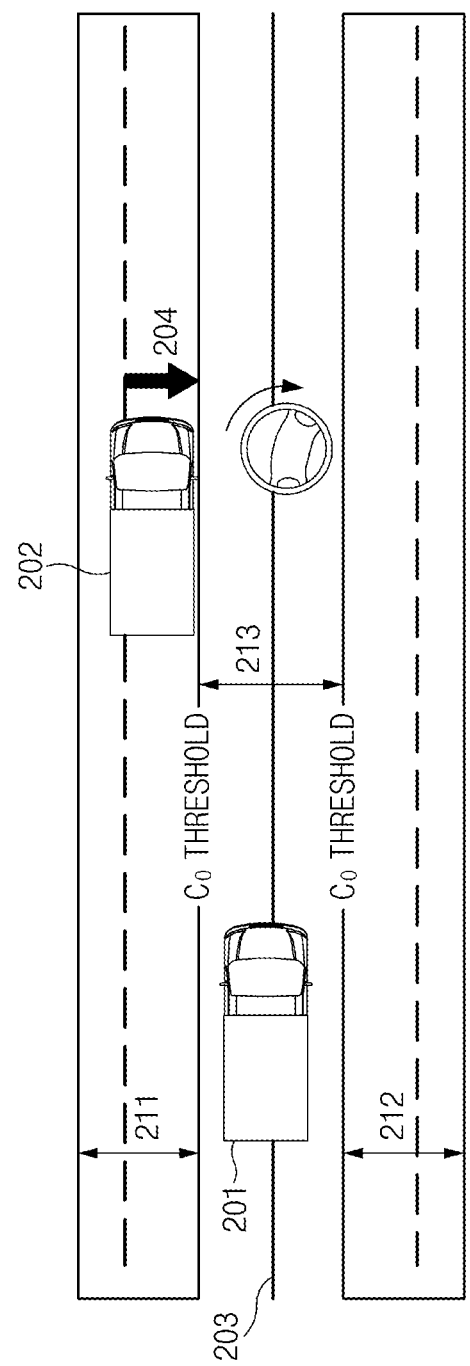
FIG. 2 is a drawing illustrating a lane keeping control situation based on center offset integration according to an exemplary embodiment of the present disclosure.
Figure 3:
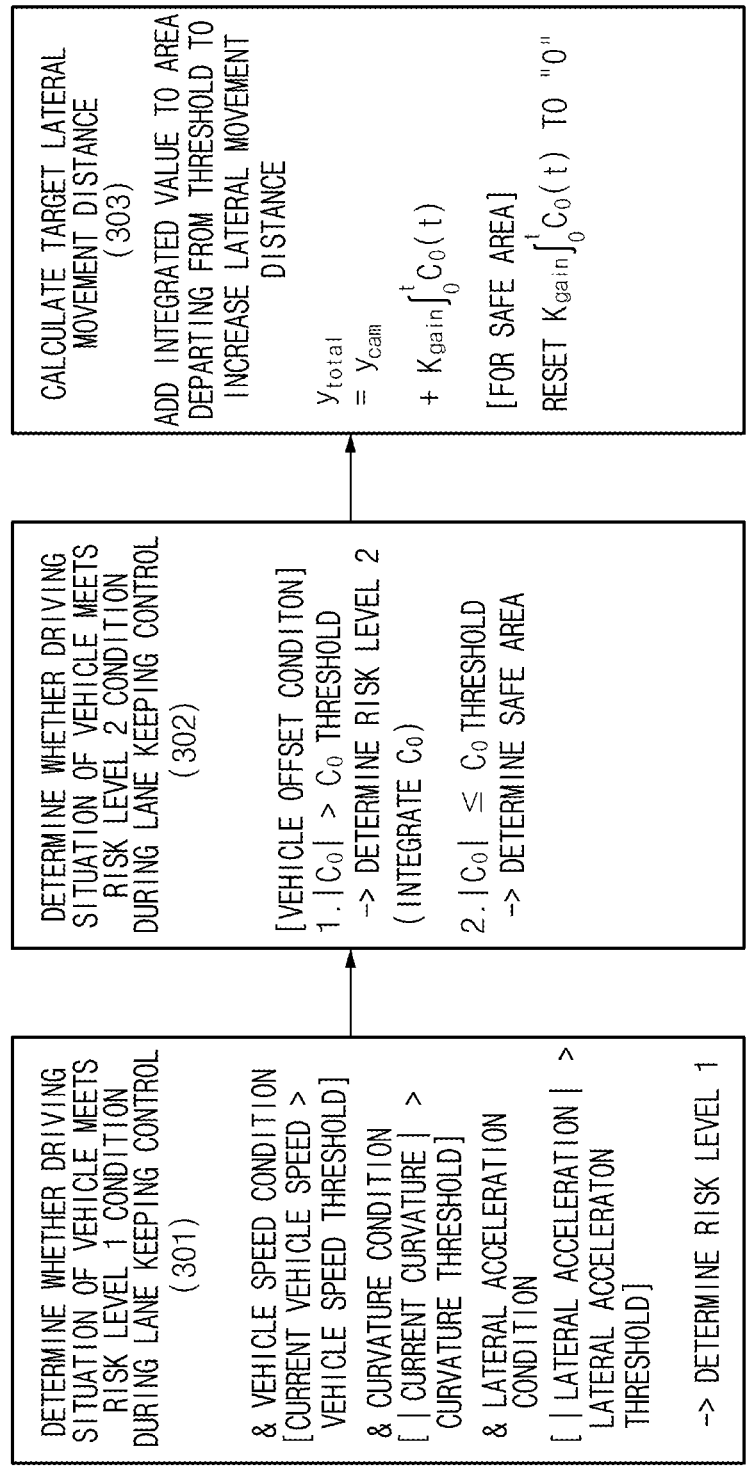
FIG. 3 is a drawing illustrating a lane keeping control process based on center offset integration according to an exemplary embodiment of the present disclosure.

FIG. 2 is a drawing illustrating a lane keeping control situation based on center offset integration according to an exemplary embodiment of the present disclosure. FIG. 3 is a drawing illustrating a lane keeping control process based on center offset integration according to an exemplary embodiment of the present disclosure.

Referring to FIG. 2, a lane keeping controller 100 of FIG. 1 may define an area within a vehicle offset ($C_0$) threshold as a safe area 213 and may define an area departing from the vehicle offset ($C_0$) threshold as an integration performance area 211 or 212.

When a vehicle 201 is located within a vehicle offset ($C_0$) threshold, that is, in a safe area 213, during lane keeping control, the lane keeping controller 100 may monitor an offset (hereinafter referred to as "vehicle offset") between a target route 203 and the vehicle 201 such that the vehicle 201 follows the target route 203 to travel and may calculate a target lateral movement distance to compensate for the vehicle offset ($C_0$) which is a difference value with the target route 203 and may control the vehicle 201 to follow the target route 203.

In other words, when the vehicle 201 is located within the vehicle offset ($C_0$) threshold, that is, when the vehicle 201 is not located on integration performance areas 211 and 212 (i.e., when the vehicle 201 is located on a safe area), the lane keeping controller 100 may calculate a target lateral movement distance based on a line component in a direction where the vehicle offset is compensated like an existing manner.

On the other hand, when a vehicle 202 departs from the vehicle offset ($C_0$) threshold to be located on the integration performance area 211 or 212 while following the target route 203, the lane keeping controller 100 may integrate an offset 204 between the vehicle 202 and the vehicle offset ($C_0$) threshold and may add the integrated value to the target lateral movement distance based on the safe area.

Referring to FIG. 3, in operation 301, the lane keeping controller 100 may determine whether the driving situation of the vehicle meets a risk level 1 condition during lane keeping control.

In this case, the lane keeping controller 100 may determine whether the driving situation of the vehicle meets the risk level 1 condition based on a vehicle speed condition, a curvature condition, or a lateral acceleration condition. In other words, when each of the vehicle speed condition, the curvature condition, and the lateral acceleration is greater than a predetermined threshold, the lane keeping controller 100 may determine that the driving situation of the vehicle meets the risk level 1 condition.

When the driving situation of the vehicle meets the risk level 1 condition, in operation 302, the lane keeping controller 100 may determine whether the driving situation of the vehicle meets a risk level 2 condition during lane keeping control. In this case, the lane keeping controller 100 may determine the risk level 2 condition based on a vehicle offset condition.

In other words, the lane keeping controller 100 may determine that the driving situation is in risk level 2, when an absolute value of a lane offset is greater than an offset threshold, and may determine that the driving situation is not in risk level 2, when the absolute value of the lane offset is less than or equal to the offset threshold.

In operation 303, the lane keeping controller 100 may calculate a final target lateral movement distance $y_{total}$ based on the vehicle offset.

When the vehicle is traveling on a safe area, the lane keeping controller 100 may set an integration performance area integration value to "0" and may calculate the final target lateral movement distance $y_{total}$ using only the target lateral movement distance $y_{cam}$ based on the safe area.

When the vehicle is traveling on an integration performance area, the lane keeping controller 100 may increase the final target lateral movement distance $y_{total}$ by adding the integration performance area integration value to the target lateral movement distance $y_{cam}$ based on the safe area.

Figure 4:
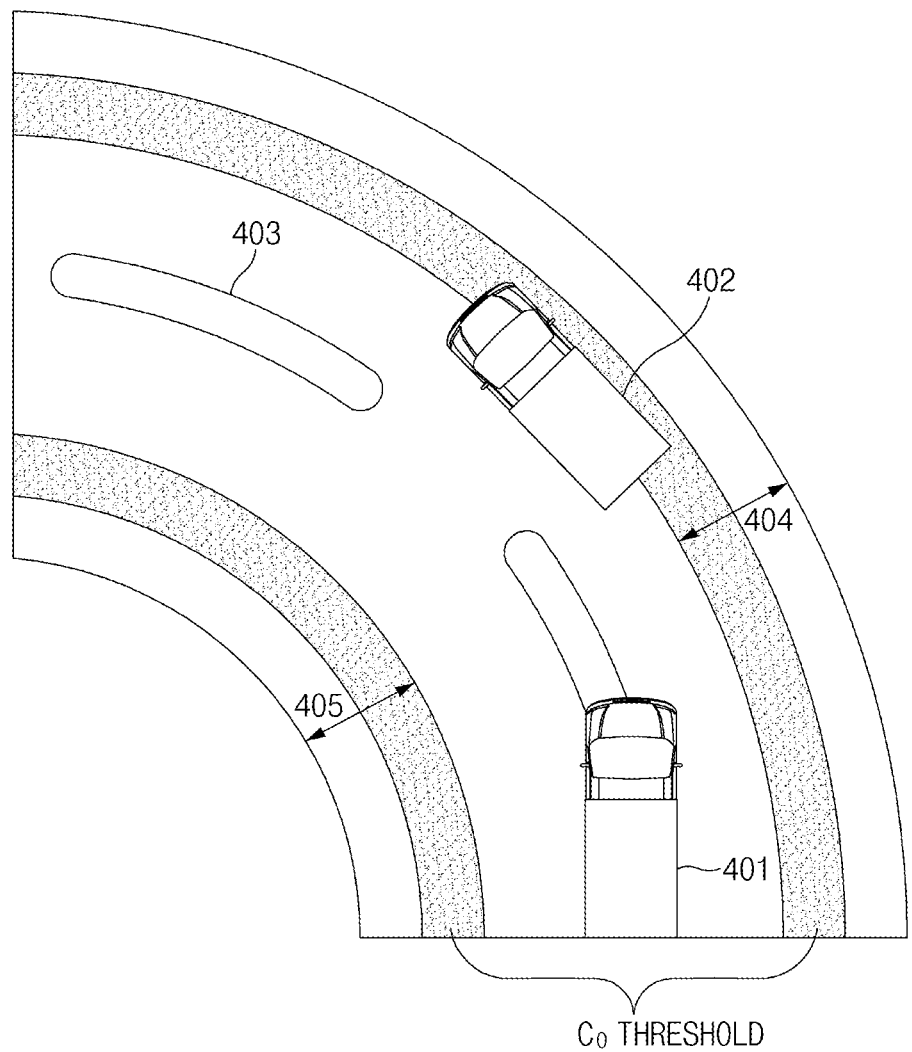
FIG. 4 is a drawing illustrating a method for determining risk level 2 upon lane keeping control according to an exemplary embodiment of the present disclosure.

FIG. 4 is a drawing illustrating a method for determining risk level 2 upon lane keeping control according to an exemplary embodiment of the present disclosure.

Referring to FIG. 4, when a vehicle 401 which is following a target route 403 departs from an integration performance area 404 or 405 when traveling on a curved road, a lane keeping controller 100 may determine that a driving situation of the vehicle 401 meets a risk level 2 condition.

Figure 5:
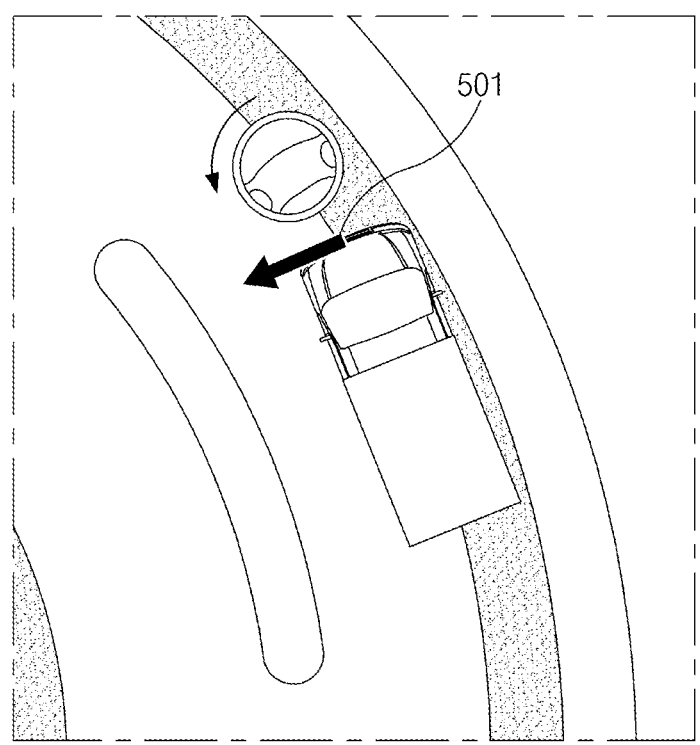
FIG. 5 is a drawing illustrating a method for calculating a target lateral movement distance in a curved section according to an exemplary embodiment of the present disclosure.
Figure 6:
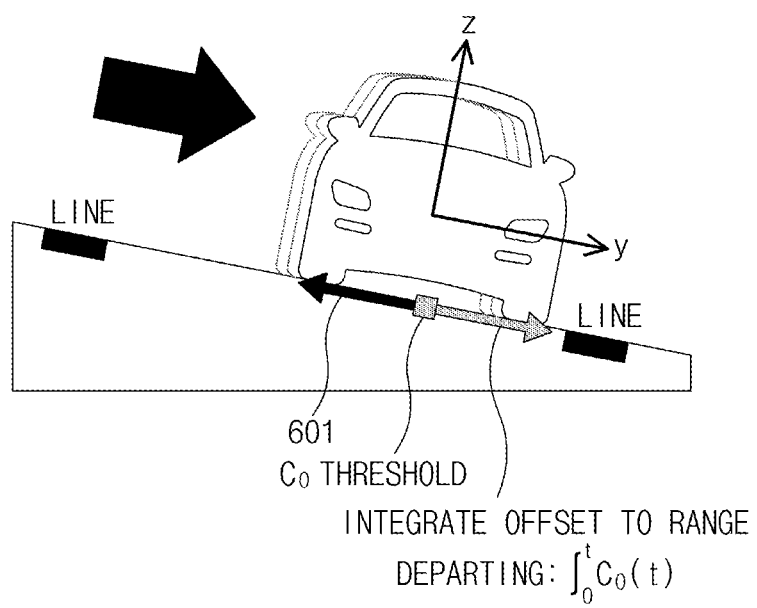
FIG. 6 is a drawing illustrating a method for calculating a target lateral movement distance in a lateral gradient section according to an exemplary embodiment of the present disclosure.

FIG. 5 is a drawing illustrating a method for calculating a target lateral movement distance in a curved section according to an exemplary embodiment of the present disclosure. FIG. 6 is a drawing illustrating a method for calculating a target lateral movement distance in a lateral gradient section according to an exemplary embodiment of the present disclosure.

Referring to FIG. 5, a lane keeping controller 100 may calculate a final target lateral movement distance 501 by integrating and adding a vehicle offset when the vehicle is traveling on an integration performance area in a curved section.

Referring to FIG. 6, when the vehicle yaws in a lateral gradient section, the lane keeping controller 100 may integrate a distance from an offset threshold to the vehicle, that is, an offset to a range which departs to calculate a target lateral movement distance 601.

Figure 7:
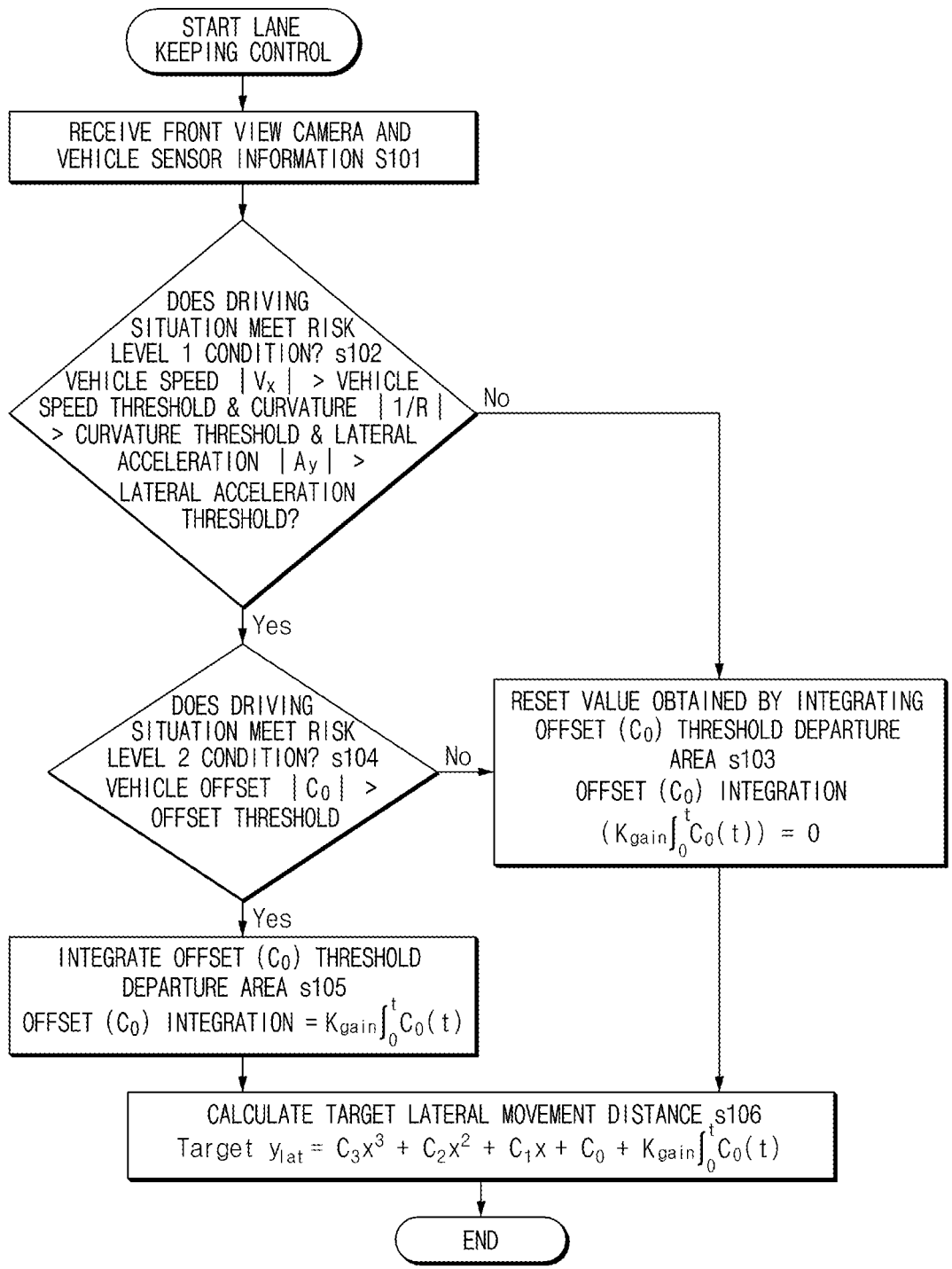
FIG. 7 is a flowchart illustrating a lane keeping control method considering a steering time delay according to an exemplary embodiment of the present disclosure.

Hereinafter, a description will be given in detail of a lane keeping control method according to an exemplary embodiment of the present disclosure with reference to FIG. 7. FIG. 7 is a flowchart illustrating a lane keeping control method based on offset integration according to an exemplary embodiment of the present disclosure.

Hereinafter, it is assumed that a lane keeping controller 100 of FIG. 1 performs a process of FIG. 7. Furthermore, in a description of FIG. 7, an operation described as being performed by a lane keeping controller 100 may be understood as being controlled by a processor 130 of the lane keeping controller 100.

Referring to FIG. 7, in S101, the lane keeping controller 100 may receive vehicle sensor information from a sensing device 200 of FIG. 1. In this case, the vehicle sensor information may include a vehicle speed, a curvature, a lateral acceleration, line information, or the like. The line information may include information about the line of the lane, a vehicle offset from a lane center, or the like.

In S102, the lane keeping controller 100 may determine whether a driving situation of a vehicle meets a risk level 1 condition based on a vehicle speed, a curvature, and a lateral acceleration among pieces of received vehicle sensor information.

The lane keeping controller 100 may determine whether the vehicle speed is greater than a predetermined vehicle speed threshold, whether the curvature is greater than a predetermined curvature threshold, and whether the lateral acceleration is greater than a lateral acceleration threshold. When the vehicle speed is greater than the predetermined vehicle speed threshold, when the curvature is greater than the predetermined curvature threshold, and when the lateral acceleration is greater than the lateral acceleration threshold, the lane keeping controller 100 may determine that the driving situation meets the risk level 1 condition.

When it is determined that the driving situation does not meet the risk level 1 condition, in S103, the lane keeping controller 100 may reset a value obtained by integrating an offset threshold departure area.

On the other hand, when the driving situation meets the risk level 1 condition, in operation S104, the lane keeping controller 100 may determine whether the driving situation meets a risk level 2 condition based on the offset between the vehicle and the target route. In other words, the lane keeping controller 100 may determine whether a vehicle offset $C_O$ is greater than an offset threshold. When the vehicle offset $C_O$ is greater than the offset threshold, the lane keeping controller 100 may determine that the driving situation meets the risk level 2 condition. In this case, the vehicle offset may be a distance between the target route and the vehicle, which may refer to a distance from a lane center to the vehicle, when the target route is the lane center.

When the driving situation does not meet the risk level 2 condition, in S103, the lane keeping controller 100 may reset the value obtained by integrating the offset ($C_O$) threshold departure area.

On the other hand, when the driving situation meets the risk level 2 condition, in S105, the lane keeping controller 100 may integrate the offset ($C_O$) threshold departure area.

In S106, the lane keeping controller 100 may calculate a target lateral movement distance.

In other words, when the driving situation meets both the risk level 1 condition and the risk level 2 condition, the lane keeping controller 100 may add the value obtained by integrating the offset ($C_O$) threshold departure area to the target lateral movement distance based on the safe area to calculate a final target lateral movement distance.

On the other hands, when the driving situation does not meet at least one of the risk level 1 condition or the risk level condition, the lane keeping controller 100 may fail to apply the value obtained by integrating the offset ($C_O$) threshold departure area when calculating the target lateral movement distance.

As such, an exemplary embodiment of the present disclosure may monitor a vehicle offset in a real time and may add the amount of integration of an offset between an offset threshold and the vehicle to a target lateral movement distance, when the vehicle offset is greater than a predetermined offset threshold, to increase the amount of lane keeping assistance control, thus enhancing center following performance of the vehicle.

Thus, an exemplary embodiment of the present disclosure may prevent the vehicle from yawing to one side or prevent oscillation from occurring, when the vehicle which has slow steering system response and has a large fluctuation in weight, for example, a bus or a truck, uses a lane keeping assistance function, thus ensuring safety of the driver.

Figure 8:
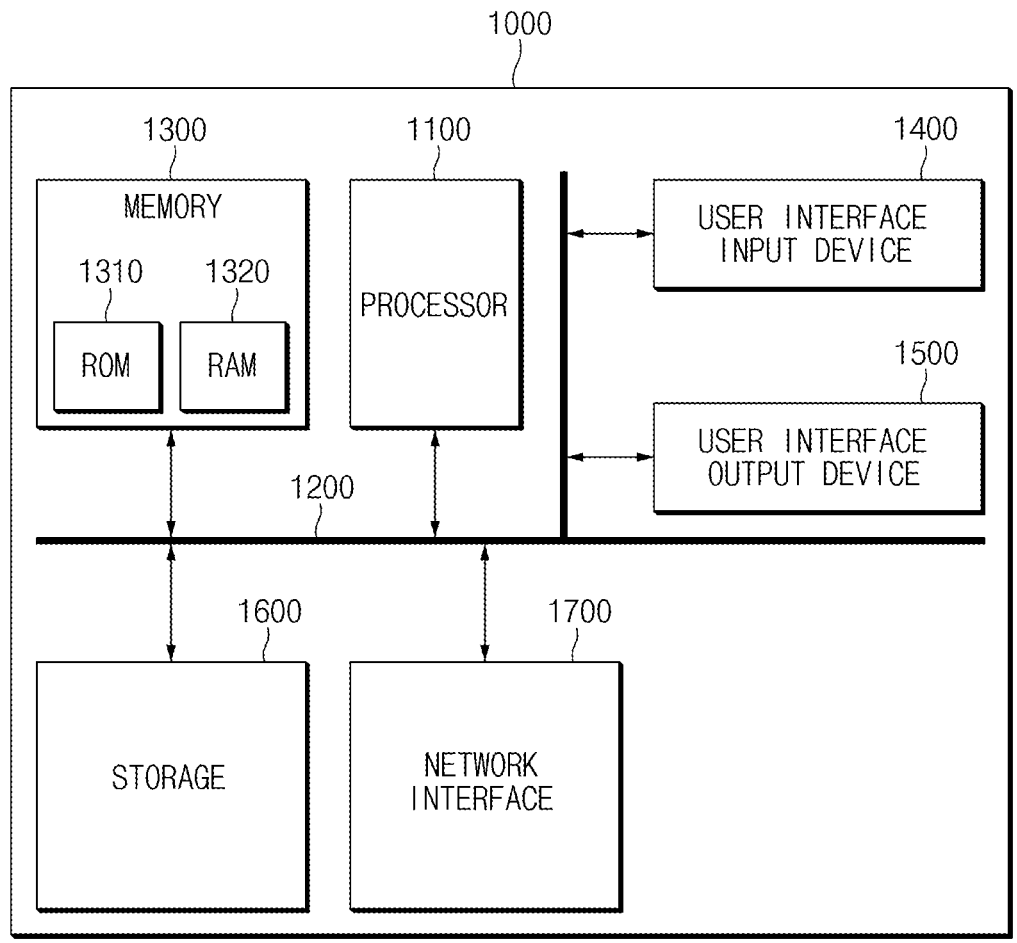
FIG. 8 is a block diagram illustrating a computing system according to an exemplary embodiment of the present disclosure.

FIG. 8 is a block diagram illustrating a computing system according to an exemplary embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may control to follow a target route by integrating an offset between the vehicle and the offset threshold when center following performance of the vehicle is degraded, thus increasing stability of the lane control system.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A lane keeping controller, comprising:
a processor configured to monitor a risk level of a vehicle in real time, upon a lane keeping control, calculate a target lateral movement distance based on a line component, integrate over time an offset from a predetermined offset threshold to the vehicle to obtain an integrated value when an offset between a target route and the vehicle departs from the predetermined offset threshold, correct the target lateral movement distance based on the integrated value to calculate a final target lateral movement distance, and perform the lane keeping control based on the final target lateral movement distance; and
a storage storing data and an algorithm run by the processor,
wherein the processor is further configured to:
determine whether a driving situation of the vehicle meets a risk level 1 condition using a vehicle speed, a curvature, and a lateral acceleration,
determine whether the driving situation meets a risk level 2 condition using the offset between the target route and the vehicle, when the driving situation meets the risk level 1 condition, and
add the integrated value to the target lateral movement distance, when the driving situation meets both the risk level 1 condition and the risk level 2 condition.

2. The lane keeping controller of claim 1, wherein the processor is further configured to determine that the driving situation meets the risk level 2 condition, when the offset between the target route and the vehicle is greater than the predetermined offset threshold.

3. The lane keeping controller of claim 1, wherein the processor is further configured to determine whether the driving situation meets the risk level 1 condition, when the vehicle speed is greater than a predetermined first reference value, when the curvature is greater than a predetermined second reference value, and when the lateral acceleration is greater than a predetermined third reference value.

4. The lane keeping controller of claim 1, wherein the processor is further configured to reset the integrated value, when the driving situation does not meet at least one of the risk level 1 condition or the risk level 2 condition.

5. The lane keeping controller of claim 1, wherein the processor is further configured to calculate the target lateral movement distance by means of a polynomial according to at least one parameter selected, for the line component, from the group consisting of the offset from the target route and the vehicle, a heading angle of the vehicle, a curvature of a road, and a curvature change rate of the road, and a look-ahead distance.

6. The lane keeping controller of claim 1, wherein the processor is further configured to control the vehicle based on the final target lateral movement distance to follow the target route.

7. The lane keeping controller of claim 1, wherein the processor is further configured to define an area ranging from the left of the target route to the right of the target route up to the predetermined offset threshold as a safe area and defines an area departing from the predetermined offset threshold as an integration performance area.

8. The lane keeping controller of claim 7, wherein the processor is further configured to calculate the target lateral movement distance based on line component information, when the vehicle is located on the safe area.

9. The lane keeping controller of claim 7, wherein the processor is further configured to integrate the offset from the predetermined offset threshold to the vehicle and adds the integrated value to the target lateral movement distance to calculate the final target lateral movement distance, when the vehicle is located on the integration performance area.

10. A vehicle system, comprising:
a sensing device configured to sense vehicle information; and
a lane keeping controller configured to monitor a risk level of a vehicle in real time based on the vehicle information, upon a lane keeping control, calculate a target lateral movement distance based on a line component, integrate over time an offset from a predetermined offset threshold to the vehicle to obtain an integrated value when an offset between a target route and the vehicle departs from the predetermined offset threshold, correct the target lateral movement distance based on the integrated value to calculate a final target lateral movement distance, and performing the lane keeping control based on the final target lateral movement distance,
wherein the lane keeping controller is further configured to:
determine whether a driving situation of the vehicle meets a risk level 1 condition using a vehicle speed, a curvature, and a lateral acceleration and determines whether the driving situation meets a risk level 2 condition using the offset between the target route and the vehicle, when the driving situation meets the risk level 1 condition, and
add the integrated value to the target lateral movement distance, when the driving situation meets both the risk level 1 condition and the risk level 2 condition.

11. The vehicle system of claim 10, wherein the vehicle information includes at least one of the offset between the target route and the vehicle, a heading angle, a curvature, a curvature change rate, a vehicle speed, or a lateral acceleration.

12. A lane keeping control method, comprising:
monitoring a risk level of a vehicle in real time, upon a lane keeping control;
calculating a target lateral movement distance based on a line component and integrating over time an offset from a predetermined offset threshold to the vehicle to obtain an integrated value when an offset between a target route and the vehicle departs from the predetermined offset threshold;
correcting the target lateral movement distance using the integrated value to calculate a final target lateral movement distance; and
performing the lane keeping control based on the final target lateral movement distance,
wherein the monitoring of the risk level of the vehicle in real time includes:
determining when a driving situation of the vehicle meets a risk level 1 condition using a vehicle speed, a curvature, and a lateral acceleration; and
determining when the driving situation meets a risk level 2 condition using the offset between the target route and the vehicle, when the driving situation meets the risk level 1 condition, and
wherein the calculating of the final target lateral movement distance includes:
adding the integrated value to the target lateral movement distance, when the driving situation meets both the risk level 1 condition and the risk level 2 condition.

13. The lane keeping control method of claim 12, wherein the calculating of the final target lateral movement distance includes:
resetting the integrated value, when the driving situation does not meet at least one of the risk level 1 condition or the risk level 2 condition.

\* \* \* \* \*